United States Patent
Das et al.

(10) Patent No.: US 9,247,446 B2
(45) Date of Patent: Jan. 26, 2016

(54) MOBILE STATION USE OF ROUND TRIP TIME MEASUREMENTS

(71) Applicant: QUALCOMM Incorporated, San Diego, CA (US)

(72) Inventors: Saumitra Mohan Das, Santa Clara, CA (US); Alok Aggarwal, Foster City, CA (US); Ayman Fawzy Naguib, Cupertino, CA (US); Edward Thomas Lingham Hardie, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/822,441

(22) Filed: Aug. 10, 2015

(65) Prior Publication Data

US 2015/0350946 A1 Dec. 3, 2015

Related U.S. Application Data

(63) Continuation of application No. 13/752,270, filed on Jan. 28, 2013, now Pat. No. 9,137,681, which is a continuation of application No. 12/772,029, filed on Apr. 30, 2010, now Pat. No. 8,781,492.

(51) Int. Cl.
*H04W 24/00* (2009.01)
*H04W 24/10* (2009.01)
(Continued)

(52) U.S. Cl.
CPC ........... *H04W 24/10* (2013.01); *H04L 43/0864* (2013.01); *H04W 4/008* (2013.01); *H04W 64/003* (2013.01); *H04W 84/10* (2013.01); *H04W 88/02* (2013.01)

(58) Field of Classification Search
CPC ........... H04W 4/00; H04W 4/02; H04W 4/04; H04W 24/10; H04W 4/008; H04W 64/003; H04W 84/10; H04W 88/02; H04L 43/0864
USPC .............................................. 455/41.2, 456.1
See application file for complete search history.

(56) References Cited

U.S. PATENT DOCUMENTS 6,181,253 B1  1/2001  Eschenbach et al.
6,477,380 B1  11/2002  Uehara et al.
(Continued)

FOREIGN PATENT DOCUMENTS

CN  1269947 A  10/2000
CN  1444833 A  9/2003
(Continued)

OTHER PUBLICATIONS

Andre Gunther, et al., "Measuring Round Trip Times to Determine the Distance between WLAN Nodes", Proceedings of Networking 2005, May 6, 2005, pp. 1- 12, XP002655207, Waterloo, Canada pp. 1-6.

(Continued)

*Primary Examiner* — Amancio Gonzalez
(74) *Attorney, Agent, or Firm* — Thomas A. Jolly

(57) ABSTRACT

Techniques are provided in which a mobile station may determine a first round-trip time (RTT) for a first measurement related communication between the transceiver and a first network device, wherein the first RTT comprises a uniform delay of time applied during the first measurement related communication by the first network device; Determine a second RTT for a second measurement related communication between the transceiver and a second network device, wherein the second RTT comprises the uniform delay of time applied during the second measurement related communication by the second network device; and determine, at least in part, a position of the mobile station with regard to at least the first and second network devices based, at least in part, on the first RTT and the second RTT.

17 Claims, 8 Drawing Sheets

(51) Int. Cl.
*H04W 64/00* (2009.01)
*H04L 12/26* (2006.01)
*H04W 4/00* (2009.01)
*H04W 84/10* (2009.01)
*H04W 88/02* (2009.01)

(56) References Cited

U.S. PATENT DOCUMENTS

| | | |
|---|---|---|
| 6,665,333 B2 | 12/2003 | McCrady et al. |
| 6,681,099 B1 | 1/2004 | Keranen et al. |
| 6,754,488 B1 | 6/2004 | Won et al. |
| 7,006,834 B2 | 2/2006 | Gaal et al. |
| 7,079,851 B2 | 7/2006 | Makuta |
| 7,130,646 B2 | 10/2006 | Wang |
| 7,138,946 B2 | 11/2006 | Tamaki et al. |
| 7,233,800 B2 | 6/2007 | Laroia et al. |
| 7,319,878 B2 | 1/2008 | Sheynblat et al. |
| 7,346,120 B2 | 3/2008 | McCorkle |
| 7,373,156 B2 | 5/2008 | Ruutu et al. |
| 7,383,049 B2 | 6/2008 | Deloach et al. |
| 7,469,139 B2 | 12/2008 | Van De Groenendaal |
| 7,525,484 B2 | 4/2009 | Karr et al. |
| 7,574,216 B2 | 8/2009 | Leitch et al. |
| 7,672,283 B1 | 3/2010 | Chang et al. |
| 7,676,218 B2 | 3/2010 | Ballai |
| 7,716,740 B2 | 5/2010 | Robert et al. |
| 7,751,829 B2 | 7/2010 | Masuoka et al. |
| 7,756,615 B2 | 7/2010 | Barfoot et al. |
| 7,810,154 B2 | 10/2010 | Hum et al. |
| 7,861,123 B1 | 12/2010 | Tamilarasan et al. |
| 7,893,873 B2 | 2/2011 | Black et al. |
| 7,899,006 B2 | 3/2011 | Boyd |
| 7,941,159 B2 | 5/2011 | Walley et al. |
| 7,983,622 B1 | 7/2011 | Vaughan |
| 8,032,153 B2 | 10/2011 | Karr et al. |
| 8,045,996 B2 | 10/2011 | Brunner et al. |
| 8,161,316 B1 | 4/2012 | Manning et al. |
| 8,165,150 B2 * | 4/2012 | Aweya ................. G01S 5/14 370/431 |
| 8,238,942 B2 | 8/2012 | Gast |
| 8,244,272 B2 | 8/2012 | Morgan et al. |
| 8,265,652 B2 | 9/2012 | Piersol et al. |
| 8,750,267 B2 | 6/2014 | Aggarwal et al. |
| 8,768,344 B2 | 7/2014 | Naguib et al. |
| 8,781,492 B2 | 7/2014 | Das et al. |
| 8,831,594 B2 | 9/2014 | Naguib et al. |
| 8,892,127 B2 | 11/2014 | Sridhara et al. |
| 9,002,349 B2 | 4/2015 | Naguib et al. |
| 2001/0053699 A1 | 12/2001 | McCrady et al. |
| 2002/0173295 A1 | 11/2002 | Nykanen et al. |
| 2003/0125046 A1 | 7/2003 | Riley et al. |
| 2003/0129995 A1 | 7/2003 | Niwa et al. |
| 2003/0182053 A1 | 9/2003 | Swope et al. |
| 2004/0003285 A1 | 1/2004 | Whelan et al. |
| 2004/0023640 A1 | 2/2004 | Ballai |
| 2004/0104842 A1 | 6/2004 | Drury et al. |
| 2004/0189712 A1 | 9/2004 | Rundell |
| 2004/0203539 A1 | 10/2004 | Benes et al. |
| 2004/0203931 A1 | 10/2004 | Karaoguz |
| 2004/0223599 A1 | 11/2004 | Bear et al. |
| 2004/0235499 A1 | 11/2004 | Tanaka et al. |
| 2004/0258012 A1 | 12/2004 | Ishii |
| 2004/0266457 A1 | 12/2004 | Dupray |
| 2005/0055412 A1 | 3/2005 | Kaminsky et al. |
| 2005/0058081 A1 | 3/2005 | Elliott |
| 2005/0130669 A1 | 6/2005 | Mizugaki et al. |
| 2005/0130699 A1 | 6/2005 | Kim |
| 2005/0201533 A1 | 9/2005 | Emam et al. |
| 2005/0208900 A1 | 9/2005 | Karacaoglu |
| 2006/0004011 A1 | 1/2006 | Becker et al. |
| 2006/0012476 A1 | 1/2006 | Markhovsky et al. |
| 2006/0085581 A1 | 4/2006 | Martin |
| 2006/0090169 A1 | 4/2006 | Daniels et al. |
| 2006/0120334 A1 | 6/2006 | Wang et al. |
| 2006/0187028 A1 | 8/2006 | Kiang et al. |
| 2006/0189329 A1 | 8/2006 | Anderson et al. |
| 2006/0195252 A1 | 8/2006 | Orr et al. |
| 2006/0200862 A1 | 9/2006 | Olson et al. |
| 2006/0256838 A1 | 11/2006 | Yarkosky |
| 2007/0002813 A1 | 1/2007 | Tenny et al. |
| 2007/0063896 A1 | 3/2007 | Alban et al. |
| 2007/0078905 A1 | 4/2007 | Gunther et al. |
| 2007/0099646 A1 | 5/2007 | Tanaka et al. |
| 2007/0115842 A1 | 5/2007 | Matsuda et al. |
| 2007/0121560 A1 | 5/2007 | Edge |
| 2007/0135134 A1 | 6/2007 | Patrick |
| 2007/0136686 A1 | 6/2007 | Price et al. |
| 2007/0200759 A1 | 8/2007 | Heidari-Bateni et al. |
| 2007/0265020 A1 | 11/2007 | Cuffaro |
| 2007/0270168 A1 | 11/2007 | Sheynblat |
| 2007/0285306 A1 | 12/2007 | Julian et al. |
| 2008/0002820 A1 | 1/2008 | Shtiegman et al. |
| 2008/0034435 A1 | 2/2008 | Grabarnik et al. |
| 2008/0068257 A1 | 3/2008 | Mizuochi |
| 2008/0069318 A1 | 3/2008 | McClung |
| 2008/0085699 A1 | 4/2008 | Hirano et al. |
| 2008/0097966 A1 | 4/2008 | Choi et al. |
| 2008/0101227 A1 | 5/2008 | Fujita et al. |
| 2008/0101277 A1 | 5/2008 | Taylor et al. |
| 2008/0180315 A1 | 7/2008 | Tarlow et al. |
| 2008/0198811 A1 | 8/2008 | Deshpande et al. |
| 2008/0232297 A1 | 9/2008 | Mizugaki et al. |
| 2008/0250498 A1 | 10/2008 | Butti et al. |
| 2008/0287056 A1 | 11/2008 | Van De Groenendaal |
| 2008/0287139 A1 | 11/2008 | Carlson et al. |
| 2008/0291883 A1 | 11/2008 | Seok |
| 2008/0299993 A1 | 12/2008 | Gordon et al. |
| 2008/0301262 A1 | 12/2008 | Kinoshita et al. |
| 2009/0011713 A1 | 1/2009 | Abusubaih et al. |
| 2009/0059797 A1 | 3/2009 | Northcutt et al. |
| 2009/0135797 A1 | 5/2009 | Zhang et al. |
| 2009/0257426 A1 | 10/2009 | Hart et al. |
| 2009/0286549 A1 | 11/2009 | Canon et al. |
| 2010/0020776 A1 | 1/2010 | Youssef et al. |
| 2010/0067393 A1 | 3/2010 | Sakimura et al. |
| 2010/0081451 A1 | 4/2010 | Mueck et al. |
| 2010/0128617 A1 | 5/2010 | Aggarwal et al. |
| 2010/0128637 A1 | 5/2010 | Aggarwal et al. |
| 2010/0130230 A1 | 5/2010 | Aggarwal et al. |
| 2010/0134348 A1 | 6/2010 | Mizuochi |
| 2010/0135178 A1 | 6/2010 | Aggarwal et al. |
| 2010/0141515 A1 | 6/2010 | Doucet et al. |
| 2010/0157848 A1 | 6/2010 | Das et al. |
| 2011/0092226 A1 | 4/2011 | Maher et al. |
| 2011/0110293 A1 | 5/2011 | Hart et al. |
| 2011/0173674 A1 | 7/2011 | Thomson et al. |
| 2011/0217987 A1 | 9/2011 | Van De Groenendaal |
| 2012/0003995 A1 * | 1/2012 | Ishii ................. G01S 5/021 455/456.1 |
| 2012/0129461 A1 | 5/2012 | Venkatraman |
| 2012/0269170 A1 | 10/2012 | Chen et al. |
| 2013/0072227 A1 | 3/2013 | Morgan et al. |
| 2013/0121173 A1 | 5/2013 | Chen et al. |
| 2013/0143497 A1 | 6/2013 | Das et al. |
| 2013/0170374 A1 | 7/2013 | Aljadeff |
| 2013/0223261 A1 | 8/2013 | Aggarwal et al. |
| 2013/0237246 A1 | 9/2013 | Aggarwal et al. |
| 2013/0286959 A1 | 10/2013 | Lou et al. |
| 2014/0269400 A1 | 9/2014 | Aldana et al. |
| 2015/0031402 A1 | 1/2015 | Sridhara et al. |

FOREIGN PATENT DOCUMENTS

| | | |
|---|---|---|
| CN | 1509561 A | 6/2004 |
| CN | 1575017 A | 2/2005 |
| CN | 1747605 A | 3/2006 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101455001 A | 6/2009 |
| EP | 1050977 A2 | 11/2000 |
| EP | 1180696 A2 | 2/2002 |

(56) References Cited

FOREIGN PATENT DOCUMENTS

| | | |
|---|---|---|
| EP | 1253404 A2 | 10/2002 |
| EP | 1253437 A2 | 10/2002 |
| EP | 1398913 A2 | 3/2004 |
| EP | 1480483 A2 | 11/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2000244967 A | 9/2000 |
| JP | 2001007764 A | 1/2001 |
| JP | 2001147262 A | 5/2001 |
| JP | 2001268622 A | 9/2001 |
| JP | 2001359146 A | 12/2001 |
| JP | 2002040121 A | 2/2002 |
| JP | 2002051000 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006145223 | 6/2006 |
| JP | 2006148457 A | 6/2006 |
| JP | 2006170891 A | 6/2006 |
| JP | 2006311475 A | 11/2006 |
| JP | 2006352810 A | 12/2006 |
| JP | 2007500491 A | 1/2007 |
| JP | 2007089006 A | 4/2007 |
| JP | 2007127584 A | 5/2007 |
| JP | 2007212420 A | 8/2007 |
| JP | 2007248362 A | 9/2007 |
| JP | 2007526445 A | 9/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008054351 A | 3/2008 |
| JP | 2008507866 A | 3/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| JP | 2013167260 A | 8/2013 |
| TW | I240085 B | 9/2005 |
| TW | I250303 B | 3/2006 |
| TW | 200618539 | 6/2006 |
| TW | 200718972 | 5/2007 |
| TW | I292829 B | 1/2008 |
| TW | 200816840 A | 4/2008 |
| TW | I300852 B | 9/2008 |
| WO | WO-9913662 | 3/1999 |
| WO | WO-0120260 A1 | 3/2001 |
| WO | WO-0123904 A2 | 4/2001 |
| WO | WO-02063327 A2 | 8/2002 |
| WO | WO-03038466 | 5/2003 |
| WO | WO-03058985 A2 | 7/2003 |
| WO | WO-2005055494 | 6/2005 |
| WO | WO-2007002416 A1 | 1/2007 |
| WO | WO-2007021292 A2 | 2/2007 |
| WO | WO-2007027166 | 3/2007 |
| WO | WO-2007056738 A2 | 5/2007 |
| WO | WO-2007120326 A2 | 10/2007 |
| WO | WO-2007121488 A1 | 10/2007 |
| WO | WO-2008012188 A1 | 1/2008 |
| WO | WO-2008051124 A1 | 5/2008 |
| WO | WO-2008057737 A2 | 5/2008 |
| WO | WO-2008066927 | 6/2008 |
| WO | WO-2008085440 A2 | 7/2008 |
| WO | WO-2008103858 | 8/2008 |
| WO | WO-2008121878 A1 | 10/2008 |
| WO | WO-2008140880 A1 | 11/2008 |
| WO | WO-2010059934 A2 | 5/2010 |
| WO | WO-2010059936 | 5/2010 |
| WO | WO-2014137545 | 9/2014 |

OTHER PUBLICATIONS

Awad A., et al., "Adaptive Distance Estimation and Localization in WSN Using RSSI Measures" 10th Euromicro Conference on Gidital System Design Architectures, Methods and Tools (DSD 2007) Los Alamitos, CA IEEE Computer Soc., Piscataway, NJ, US Aug. 29, 2007 pp. 471-478.

Blumenthal J, et al., "Precise Positioning with a Low Complexity Algorithm in Ad hoc Wireless Sensor Networks" Pik. Praxis Der Informationsverarbeitung und Kommunikation, Saur, Muenchen, DE LNKD-DOI:10.1515/PIK0.2005.80, [Online] vol. 28, No. 2, Jun. 1, 2005, pp. 80-85, XP002495976.

Gerasenko S., et al., "Beacon Signals: What, Why, How, and Where", IEEE Computer Society, Computer, vol. 34, No. 10, pp. 108-110, Oct. 2001, doi:10.1109/2.955103.

Golden Stuart A. et al., "Sensor Measurements for WI-FI Location with Emphasis on Time-of-Arrival Ranging," IEEE Transactions on Mobile Computing, vol. 6 (10), 2007.

International Search Report and Written Opinion—PCT/US2011/034677, International Search Authority—European Patent Office—Aug. 16, 2011.

Israel Martin-Escalona, et al., "Impact of geometry on the accuracy of the passive-TDOA algorithm" Personal, Indoor and Mobile Radio Communications, 2008. PIMRC 2008. IEEE 19th International Symposium on, IEEE, Piscataway, NO, USA, Sep. 15, 2008, pp. 1-6, XP031371602 ISBN: 978-1-4244-2643-0 abstract I I. Passive-TDOA Positioning Algorithm.

Lim Y., et al., "Wireless Intrusion Detection and Response", IEEE, 8 Pages, 2003.

Manolakis D.E., "Efficient Solution and Performance analysis of 3-D Position Estimatin by Trilateration", IEEE Transactions on Aerospace and Electronic Systems, vol. 32, No. 4, Oct. 1996.

Mao, et al., "Wireless sensor network localization techniques" Computer Networks, Elsevier Science Publishers B.V;, Amsterdam, NL LNKD- DOI: 10.1016/J.COMNET. 2006.11.018, vol. 51, No. 10, May 6, 2007, pp. 2529-2553, XP022063022 ISSN: 1389-1286.

McCrady, et al. "Mobile Ranging with Low Accuracy Clocks", Radio and Wireless Conference 1999, pp. 85-88.

Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121 -125, XP031359266 ISBN: 978-1-4244-1719-3.

Watkins L., et al., "A Passive Approach to Rogue Access Point Detections", IEEE, 6 pages, 2007.

Xinrong Li, et al., "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 3015-3020, XP010525129 ISBN: 978-0-7803-6507-0 abstract p. 3017, right-hand column.

\* cited by examiner

USOO9247446B2

MOBILE STATION USE OF ROUND TRIP TIME MEASUREMENTS

CLAIM OF PRIORITY UNDER 35 U.S.C. 120

This application is a continuation of U.S. application Ser. No. 13/752,270, filed Jan. 28, 2013, entitled "Device for Round Trip Time Measurements," which is a continuation of U.S. application Ser. No. 12/772,029, filed Apr. 30, 2010, entitled "Device for Round Trip Time Measurements," each of which are assigned to the assignee hereof and incorporated herein by reference.

BACKGROUND

1. Background Field

Aspects of the present disclosure generally relate to wireless communication systems, and more specifically, to position determination for mobile stations by facilitating accurate measurement of a round trip time (RTT) using a dedicated network appliance.

2. Relevant Background

Mobile communications networks are offering increasingly sophisticated capabilities associated with position location. New software applications, such as, for example, those related to personal productivity, collaborative communications, social networking, and data acquisition, may use position information to provide new features and services to consumers. Aside from the sizeable commercial potential, regulatory requirements in some jurisdictions may require a network operator to report the location of a mobile station when the mobile station places a call to an emergency service, such as a 911 call in the United States.

Position determination has conventionally been provided using digital cellular positioning techniques, Satellite Positioning Systems (SPS's) and the like. In conventional digital cellular networks, position location capability can also be provided by various time and phase measurement techniques from points with a known location such as access points or base stations. For example, one position determination approach used in CDMA networks is referred to as Advanced Forward Link Trilateration (AFLT). Using AFLT, a mobile station may compute its position from phase measurements of pilot signals transmitted from a plurality of base stations.

Improvements to AFLT have resulted from the hybrid position location techniques, for example, where the mobile station may employ a Satellite Positioning System (SPS) receiver in addition to measurement techniques associated with the reception of base station signals. The SPS receiver provides position information independent of the information derived from the signals transmitted by the base stations. Position accuracy can be improved by combining measurements derived from both SPS and AFLT systems using conventional techniques.

However, conventional position location techniques based upon signals provided by SPS and cellular base stations may encounter difficulties when the mobile station is operating within a building and within urban environments or in situations when high accuracy is desired. In such situations, signal reflection and refraction, multipath, and signal attenuation, and the like can significantly reduce position accuracy, and can slow the "time-to-fix" to unacceptably long time periods. These issues may be overcome using signals from other existing wireless networks, such as, for example, Wi-Fi standards under 802.11x, to derive position information. Conventional position determination techniques used in other existing wireless networks may use round trip time (RTT) measurements derived from signals used within these networks.

RTT measurements from stations (STA) to access points (APs) in short range radio or wireless communication networks, such as 802.11 or Wi-Fi networks, Bluetooth networks, and the like, can be used to determine the location of or localize a station via trilateration. As is understood by those of skill in the art, trilateration is used to determine the intersections of three circular or four spherical areas given the centers and radii of the circles or spheres. Accurate localization can, for example, assist in the efficient allocation of network resources, the provision of location based services, and can provide additional advantages. In conventional networks, APs can be used for localization; however, the use of existing APs has several potential challenges.

It will be understood that, while 2 dimensional positioning requires at least three non-collinear APs, a particular geometry having three non-collinear APs may not be available in an existing deployment. Accurate localization using RTT ranging can require that APs have consistent processing delays with low variance. However, APs with adequate resources for localization may not be available in all deployment scenarios. Further, heavy loading on a given AP such as processing a large memory transfer via direct memory addressing (DMA) may cause variation in the RTT turn-around time and thus degrade localization accuracy and stability. Still further, contention may arise between the localization traffic and the normal data/control traffic if using a deployed AP for localization, leading to delay or loss of localization data. Still further, localization may require configuration or updates to the software/firmware on the AP so as to enable the delivery of network geometry, map URIs or other information. However such configuration and updating may not be possible in all deployment scenarios.

Using RTT measurement techniques to accurately determine position typically involves knowledge of time delays incurred by the wireless signals as they propagate through various devices comprising the network. In practice, when employing conventional RTT positioning techniques, estimating processing delay times may involve extensive additional software at both the STA and the AP to characterize and interpret RTT processing delays, hardware changes in the wireless APs, and time-consuming pre-deployment fingerprinting and calibration of the operational environment.

Accordingly, when using RTT techniques for position determination, it may be desirable to avoid hardware changes in wireless access points or to avoid substantial additional processing so as to improve the position location accuracy and performance in a cost-efficient manner.

SUMMARY

Exemplary In accordance with certain aspects, a mobile station may be provided which comprises a transceiver and a processing unit, wherein the processing unit may be configured to determine a first round-trip time (RTT) for a first measurement related communication between the transceiver and a first network device, wherein the first RTT comprises a uniform delay of time applied during the first measurement related communication by the first network device; determine a second RTT for a second measurement related communication between the transceiver and a second network device, wherein the second RTT comprises the uniform delay of time applied during the second measurement related communication by the second network device; and determine, at least in part, a position of the mobile station with regard to at least the first and second network devices based, at least in part, on the first RTT and the second RTT.

In accordance with certain aspects, an apparatus may be provided for use in a mobile station, the apparatus may comprise: means for determining a first round-trip time (RTT) for a first measurement related communication between the transceiver and a first network device, wherein the first RTT comprises a uniform delay of time applied during the first measurement related communication by the first network device; means for determining a second RTT for a second measurement related communication between the transceiver and a second network device, wherein the second RTT comprises the uniform delay of time applied during the second measurement related communication by the second network device; and means for determining, at least in part, a position of the mobile station with regard to at least the first and second network devices based, at least in part, on the first RTT and the second RTT.

In accordance with certain aspects, a method for use at a mobile station may comprise: determining a first round-trip time (RTT) for a first measurement related communication between the transceiver and a first network device, wherein the first RTT comprises a uniform delay of time applied during the first measurement related communication by the first network device; determining a second RTT for a second measurement related communication between the transceiver and a second network device, wherein the second RTT comprises the uniform delay of time applied during the second measurement related communication by the second network device; and determining, at least in part, a position of the mobile station with regard to at least the first and second network devices based, at least in part, on the first RTT and the second RTT.

In accordance with certain aspects, a non-transitional computer-readable medium having instructions stored therein may be provided, in which the instructions are executable by a processing unit of a mobile station to: determine a first round-trip time (RTT) for a first measurement related communication between the transceiver and a first network device, wherein the first RTT comprises a uniform delay of time applied during the first measurement related communication by the first network device; determine a second RTT for a second measurement related communication between the transceiver and a second network device, wherein the second RTT comprises the uniform delay of time applied during the second measurement related communication by the second network device; and determine, at least in part, a position of the mobile station with regard to at least the first and second network devices based, at least in part, on the first RTT and the second RTT.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
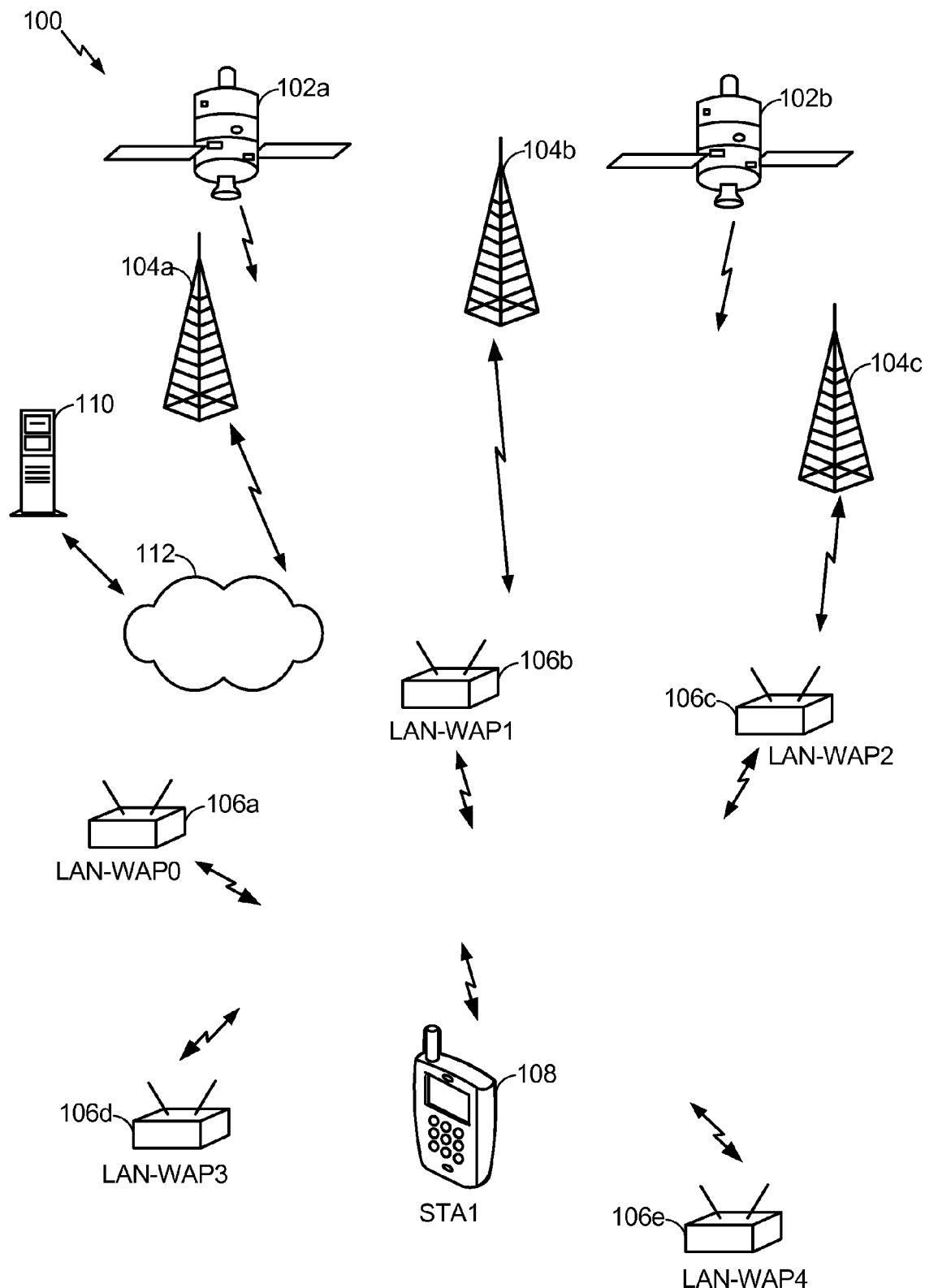
FIG. 1 is a diagram illustrating an exemplary operating environment for a mobile station consistent with embodiments of the disclosure.

Aspects of the invention are disclosed in the following description and related drawings directed to specific embodiments of the invention. Alternate embodiments may be devised without departing from the scope of the invention. Additionally, well known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and "including", when used herein, specify the presence of stated features, integers, steps, operations, elements, and components, but do not preclude the presence or addition of one or more other features, integers, steps, operations, elements, components, and groups thereof.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

By way of brief summary and in accordance with various exemplary embodiments, an exemplary round trip time appliance (RTT_APP) can be provided that provides accurate and rapid localization of a station (STA) or that assists in improving existing localization measurements or estimates. The RTT_APP, by providing a limited number of dedicated functions and a uniform processing delay, avoids many of the above noted issues, particularly those related to extensive processing needed to develop estimates for AP based processing delays. The RTT_APP can, for example, be configured to send ACKs in response to directed RTT measurement packets with no other processing functionality being implemented. The RTT_APP can be additionally configured to send beacons if necessary for delivering information about the network. The RTT_APP can operate on any one of, or a combination of multiple bands such as, for example, Wi-Fi 802.11 bands or the like. The RTT_APP may support configuration to allow delivery of URIs for delivering network geometry or maps.

In accordance with various exemplary embodiments, the RTT_APP has an advantageously low size, low cost and low power and requires less hardware and software functionality than general-purpose access points. The RTT_APP need not support typical AP features such as routing, switching, bridging and the like and does not need extra ports such as Ethernet, WAN, USB ports or the like. The RTT_APP need not support the advanced software configuration required to enable different topologies, security profiles, VLANs and the like. The exemplary RTT_APP allows the deployment of indoor positioning by replacing, or complementing existing infrastructure that may not be deployed in a manner well suited for localization. While the RTT_APP is capable of sending occasional beacon signals, since the RTT_APP is primarily configured to respond to RTT measurement requests, operation can be extended for long periods of time on, for example, battery power, in a manner much more effectively than a conventional AP. Thus, an RTT_APP can be deployed where mainline power sources are not available. As will be further described herein below, the RTT_APP can provide all of the above noted and additional advantages in a manner not previously contemplated.

FIG. 1 is a diagram of an exemplary operating environment 100 for a STA1 108. Embodiments of the invention are directed to a RTT_APP that can assist STA1 108 to determine its position based upon round trip time (RTT) measurements where processing delays introduced by wireless access points can be minimized or eliminated. It will be appreciated that various embodiments address disadvantages associated with variations in the processing delays among different access points. In addition to static differences in the processing delays among access points, the variations may change over time due to load conditions and the like. Since positioning accuracy may be compromised by the differences in processing delay the need arises for eliminating variable processing delays.

The operating environment 100 may contain one or more different types of wireless communication systems and wireless positioning systems. In the embodiment shown in FIG. 1, a Satellite Positioning System (SPS) 102 may be used as an independent source of position information for the STA1 108. The STA1 108 may include one or more dedicated SPS receivers specifically designed to receive signals for deriving geolocation information from the SPS satellites (102a, 102b, etc.).

It will be appreciated that, in general, an SPS may include a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The operating environment 100 may also include a plurality of one or more types of Wide Area Network Wireless Access Points (WAN-WAPs) 104, which may be used for wireless voice and data communication, and as another source of independent position information for STA1 108. Typically, each of the WAN-WAPs 104a-104c within the WWAN may operate from fixed positions, and provide network coverage over large metropolitan and regional areas. The WAN-WAPs 104 may be part of a wireless wide area network (WWAN), which may include cellular base stations at known locations, and other wide area wireless systems, such as, for example, WiMAX nodes as specified under 802.16. It will be appreciated that the WWAN may include other known network components which, for simplicity, are not shown in FIG. 1.

The operating environment 100 may further include Local Area Network Wireless Access Points (LAN-WAPs) 106, which may be used for wireless voice and data communication, and as another independent source of position data. The LAN-WAPs 106 can be part of a Wireless Local Area Network (WLAN), which may operate in buildings and perform communications over smaller geographic regions than a WWAN. Such LAN-WAPs 106 may be part of, for example, Wi-Fi networks such as networks specified for operation in accordance with 802.11x, cellular piconets and femtocells, Bluetooth Networks, and the like.

The STA1 108 may derive position information from any one or a combination of the SPS satellites 102, the WAN-WAPs 104, and the LAN-WAPs 106. Each of the aforementioned systems can provide an independent estimate of the position for STA1 108 using different techniques. In some embodiments, the mobile station may combine the solutions derived from each of the different types of access points to improve the accuracy of the position data. However, for increased accuracy, particularly within an indoor location where satellite signals may be difficult to receive, reliance on localization or trilateration based on signal sources closer in proximity to the STA1 108 results in the potential for greater accuracy.

When deriving position using the SPS 102, the mobile station may use a receiver specifically designed for use with the SPS that extracts position, using conventional techniques, from a plurality of signals transmitted by SPS satellites 102. The method and apparatus described herein may be used with various satellite positioning systems, such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that use pseudolites or a combination of satellites and pseudolites. Pseudolites are ground-based transmitters that broadcast a PN code or other ranging code that is similar to a GPS or CDMA cellular signal and is modulated on an L-band or other frequency carrier signal, which may be synchronized with GPS time. Each such pseudolite transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

When deriving position from the WWAN, each WAN-WAPs 104a-104c may take the form of base stations within a digital cellular network, and the STA1 108 may include a cellular transceiver and processing unit that can exploit the base station signals to derive position. Such cellular networks may include, but are not limited to, standards in accordance with GSM, CMDA, 2G, 3G, 4G, LTE, and the like. It should be understood that the digital cellular network may include additional base stations or other resources shown in FIG. 1. While WAN-WAPs 104 may actually be movable or otherwise capable of being relocated, for illustration purposes it will be assumed that they are essentially arranged in a fixed position.

The STA1 108 may perform position determination using known time of arrival techniques such as, for example, Advanced Forward Link Trilateration (AFLT). In other embodiments, each WAN-WAP 104a-104c may take the form of a WiMAX wireless networking base station. In such a case, the STA1 108 may determine its position using time-of-arrival (TOA) techniques from signals provided by the WAN-WAPs 104. The STA1 108 may determine positions either in a stand alone mode, or using the assistance of a positioning server 110 and network 112 using TOA techniques, as will be described in more detail below. Note that embodiments of the disclosure include having the STA1 108 determine position information using WAN-WAPs 104 which are of different types. For example, some WAN-WAPs 104 may be cellular base stations, and other WAN-WAPs may be WiMAX base stations. In such an operating environment, the STA1 108 may be able to exploit the signals from each different type of WAN-WAP, and further combine the derived position solutions to improve accuracy.

When deriving position using the WLAN, the STA1 108 may use time of arrival techniques with the assistance of the positioning server 110 and the network 112. The positioning server 110 may communicate to the mobile station through network 112. Network 112 may include a combination of wired and wireless networks which incorporate the LAN-WAPs 106. In one embodiment, each LAN-WAP 106a-106e may be, for example, a wireless access point, which is not necessarily set in a fixed position and can change location. The position of each LAN-WAP 106a-106e may be stored in the positioning server 110 in a common coordinate system. In one embodiment, the position of the STA1 108 may be determined by having the STA1 108 receive signals from each LAN-WAP 106a-106e. Each signal may be associated with its originating LAN-WAP based upon some form of identifying information that may be included in the received signal such as, for example, a MAC address. The STA1 108 may then derive the time delays associated with each of the sorted received signals. The STA1 108 may then form a message which can include the time delays and the identifying information of each of the LAN-WAPs, and send the message via network 112 to the positioning server 110. Based upon the received message, the positioning server may then determine a position, using the stored locations of the relevant LAN-WAPs 106, of the STA1 108. The positioning server 110 may generate and provide a Location Configuration Indication (LCI) message to the STA1 108 that includes a pointer to the position of the mobile station in a local coordinate system. The LCI message may also include other points of interest in relation to the location of the STA1 108. LCI may first be established simply as a result of server 110 knowing the MAC addresses of nearby LAN-WAPs that the STA 108 can see. Along with the LCI, the positions of the nearby LAN-WAPs are given to the STA 108 whereupon the STA 108 can derive its position using the nearby LAN-WAPs positions. Alternatively, server 110 may generate an LCI that includes the STA position. It should be noted that the position of STA 108 can be derived at server 110 or at the STA 108. When deriving position at the STA 108, server 110 provides an LCI with the positions of LAN-WAPs as described. When computing the position of the STA1 108, the positioning server 110 may take into account the different delays which can be introduced by elements within the wireless network.

The position determination techniques described herein may be used for various wireless communication networks such as a wireless wide area network (WWAN), a wireless local area network (WLAN), a wireless personal area network (WPAN), and so on. The terms "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and WPAN.

Figure 2:
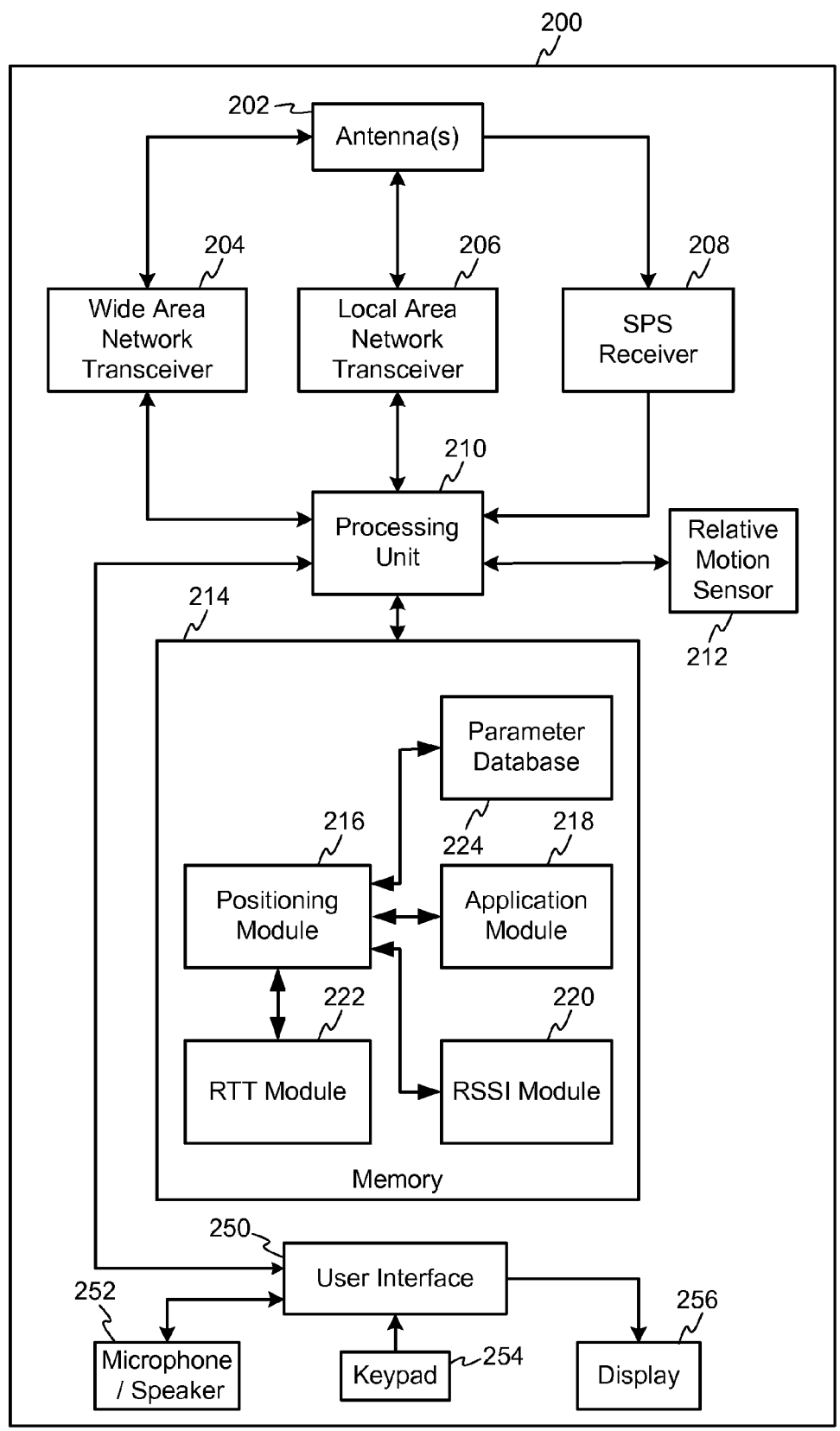
FIG. 2 is a block diagram illustrating various components of an exemplary mobile station.

The block diagram of FIG. 2 illustrates various components of an exemplary mobile station 200 (e.g., STA1 108 of FIG. 1). For the sake of simplicity, the various features and functions illustrated in the box diagram of FIG. 2 are connected together using a common bus which is meant to represent that these various features and functions are operatively coupled together regardless of the specific coupling means. Aside from a common bus connection, those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The mobile station 200 may include one or more wide area network transceiver(s) 204 that may be connected to one or more antennas 202. The wide area network transceiver 204 can include suitable devices, hardware, and software for communicating with and detecting signals to/from WAN-WAPs 104, and directly with other wireless devices within a network. In one aspect, the wide area network transceiver 204 may include a CDMA communication system suitable for communicating with a CDMA network of wireless base stations. However, in other aspects, the wireless communication system may include a different type of cellular telephony technology, such as, for example, a TDMA or GSM network, or the like. Additionally, any other type of wireless networking technologies may be used, for example, WiMAX in accordance with the 802.16 standard, and the like. The mobile station 200 may also include one or more local area network transceivers 206 that may be connected to one or more antennas 202. The local area network transceiver 204 includes suitable devices, hardware, and software for communicating with and detecting signals to/from LAN-WAPs 106, and directly with other wireless devices within a network. In one aspect, the local area network transceiver 206 may include a Wi-Fi communication system, for example in accordance with the 802.11x standard, suitable for communicating with one or more wireless access points. However in other aspects, the local area network transceiver 206 can include another type of local area network technology, personal area network technology, such as a Bluetooth network, or the like. Additionally, any other type of wireless networking technologies may be used, for example, Ultra Wide Band, ZigBee, wireless USB, or the like.

As used herein, the abbreviated term "wireless access point" (WAP) may refer to LAN-WAPs 106 and WAN-WAPs 104. Specifically, in the description presented below, when the term "WAP" is used, it should be understood that embodiments may include a mobile station 200 that can exploit signals from a plurality of LAN-WAPs 106, a plurality of WAN-WAPs 104, or any combination of the two. The specific type of WAP being used by the mobile station 200 may depend upon the environment of operation. Moreover, the mobile station 200 may dynamically select between the various types of WAPs in order to arrive at an accurate position solution.

An SPS receiver 208 may also be included in mobile station 200. The SPS receiver 208 may be connected to the one or more antennas 202 for receiving satellite signals. The SPS receiver 208 may comprise any suitable hardware and software for receiving and processing SPS signals. The SPS receiver 208 requests information and operations as appropriate from the other systems, and performs the calculations necessary to determine the position of mobile station 200 using measurements obtained by any suitable SPS algorithm.

It should be noted that in some embodiments, a relative motion sensor 212 may be coupled to processing unit 210 to provide relative movement and orientation information independently of motion data derived from signals received by the wide area network transceiver 204, the local area network transceiver 206 and the SPS receiver 208.

By way of example but not limitation, relative motion sensor 212 may use an accelerometer, such as a MEMS device, a gyroscope, a geomagnetic sensor such as a compass, an altimeter such as a barometric pressure altimeter, and any other type of movement detection sensor. Moreover, relative motion sensor 212 may include a plurality of different types of devices and combine their outputs in order to provide motion information. For example, relative motion sensor may use a combination of a multi-axis accelerometer and orientation sensors to provide the ability to compute positions in 2-D and 3-D coordinate systems.

A processing unit 210 may be coupled to the wide area network transceiver 204, local area network transceiver 206, the SPS receiver 208 and the relative motion sensor 212. The processing unit may include one or more microprocessors, microcontrollers, and digital signal processors that provide processing functions, as well as other calculation and control functionality. The processing unit 210 may also include or be otherwise coupled to a memory 214 for storing data and software instructions for executing programmed functionality within the mobile station. The memory 214 may be on-board the processing unit 210, such as within the same IC package, or the memory may be external memory to the processing unit and functionally coupled over a data bus or the like, or a combination of internal and external memory. The details of software functionality associated with aspects of the disclosure will be discussed in more detail below.

A number of software modules and data tables may reside in memory 214 and be used by the processing unit 210 in order to manage both communications and positioning determination functionality. As illustrated in FIG. 2, memory 214 may include and otherwise receive a wireless-based positioning module 216, an application module 218, a received signal strength indicator (RSSI) module 220, a round trip time (RTT) module 222, and a relative positioning module (not shown). It should be appreciated that the organization of the memory contents as shown in FIG. 2 is merely exemplary, and as such the functionality of the modules and data structures may be combined, separated, and be structured in different ways depending upon the implementation of the mobile station 200.

The application module 218 may be a process running on the processing unit 210 of the mobile station 200, which requests position information from the wireless-based positioning module 216. Alternatively, the position information may be provided continuously, periodically, or the like by positioning module 216, either autonomously or under the control of the application module 218. Applications typically run within an upper layer of a communications architecture model, such as the Application Layer of the open systems interconnect (OSI) seven layer Open Architecture protocol model, and may include Indoor Navigation, Buddy Locator, Shopping and Coupons, Asset Tracking, location-aware Service Discovery and the like. The wireless-based positioning module 216 may derive the position of the mobile station 200 using information derived from the RTTs measured from signals exchanged with a plurality of WAPs. In order to accurately determine position using RTT techniques, reasonable estimates of processing time delays introduced by each WAP may be used to calibrate/adjust the measured RTTs. The measured RTTs may be determined by the RTT module 222, which can measure the timings of signals exchanged between the mobile station 200 and the WAPs to derive RTT information.

Once measured, the RTT values may be passed to the wireless-based positioning module 216 to assist in determining the position of the mobile station 200. The wireless-based positioning module 216 may use the amplitude values of the signals transmitted by the WAPs to assist in the estimation of the processing times of the WAPs. These amplitude values may be determined in the form of RSSI measurements determined by RSSI module 220. The RSSI module 220 may provide amplitude and statistical information regarding the signals to the wireless-based positioning module 216. The wireless-based positioning module 216 use the RTT measurements to accurately determine position based on propagation delay measurements and the like as will be further described herein below.

Without the effects associated with reducing and making uniform the processing delay as provided, for example, by the RTT_APP as discussed and described herein, additional calibration would be required to further refine the processing times of the WAPs using information obtained, for example, by the relative motion sensor 212 or other sections. In one embodiment, the relative motion sensor 212 may directly provide position and orientation data to the processing unit 210, which may be stored, for example, in memory 214. In other embodiments, the relative motion sensor 212 may provided data which should be further processed by processing unit 210 to derive information to perform the calibration. For example, the relative motion sensor 212 may provide acceleration and orientation data (single or multi-axis).

The position may be output to the application module 218, such as in response to request or in a continuous manner. In addition, the wireless-based positioning module 216 may use a parameter database 224 for exchanging operational parameters. Such parameters may include the determined processing times for each WAP, the WAPs positions in a common coordinate frame, various parameters associated with the network, initial processing time estimates, and the like. Details of the parameters will be provided in subsequent sections below.

In other embodiments, the additional information may optionally include auxiliary position and motion data which may be determined from other sources besides the relative motion sensor 212, such as, for example, from SPS measurements. The auxiliary position data may be intermittent and noisy, but may be useful as another source of independent information for estimating or confirming estimates of the positioning of the WAPs, or for estimating or confirming other information associated with positioning, depending upon the environment in which the mobile station 200 is operating.

While the modules shown in FIG. 2 are illustrated in the example as being contained in memory 214, it is recognized that in certain implementations such procedures may be provided for or otherwise operatively arranged using various mechanisms. For example, all or part of wireless-based positioning module 216 and application module 218 may be provided in firmware. Additionally, while in the present example, wireless-based positioning module 216 and application module 218 are illustrated as being separate features, it is recognized, for example, that such procedures may be combined together as one procedure or perhaps with other procedures, or otherwise further divided into a plurality of sub-procedures. Each of the various alternate and/or additional configurations may be encompassed as a means for performing various inventive functions as further described herein below.

Processing unit 210 may include any form of logic suitable for performing at least the techniques provided herein. For example, processing unit 210 may be operatively configurable based on instructions in memory 214 to selectively initiate one or more routines that exploit motion data for use in other portions of the mobile station.

The mobile station 200 may include a user interface 250 which provides any suitable interface systems, such as a microphone/speaker 252, keypad 254, and display 256 that allows user interaction with the mobile station 200. The microphone/speaker 252 can provide for voice communication services using the wide area network transceiver 204 and the local area network transceiver 206. The keypad 254 can include any type of keypad containing any suitable buttons for user input. The display 256 comprises any suitable display, such as, for example, a backlit LCD display, and may further include a touch screen display for additional user input modes.

As used herein, STA1 108 may be any portable or movable device or machine that is configurable to acquire wireless signals transmitted from, and transmit wireless signals to, one or more wireless communication devices or networks. As shown in FIG. 1 and FIG. 2, the mobile station is representative of such a portable wireless device. Thus, by way of example but not limitation, STA1 108 may include a radio device, a cellular telephone device, a computing device, a personal communication system (PCS) device, or other like movable wireless communication equipped device, appliance, or machine.

As used herein, the term "wireless device" may refer to any type of wireless communication device which may transfer information over a network and also have position determination and navigation functionality. The wireless device may be any cellular mobile terminal, personal communication system (PCS) device, personal navigation device, laptop, personal digital assistant, or any other suitable mobile station capable of receiving and processing network and SPS signals for wireless-based position determination.

Wireless-based position determination may be accomplished in a variety of ways using separate signal sources or a combination thereof. In some embodiments, wireless position determination may be performed using SPS measurements. For example, if the STA1 108 has just entered an indoor environment, and if the indoor environment does not severely attenuate SPS signals, SPS positioning may be used. In other embodiments, techniques using signals employed for voice/data communication may be exploited for position determination. Various techniques in this category are set forth in the co-pending application entitled "WIRELESS POSITION DETERMINATION USING ADJUSTED ROUND TRIP TIME MEASUREMENTS" (U.S. patent application Ser. No. 12/622,289).

Figure 3:
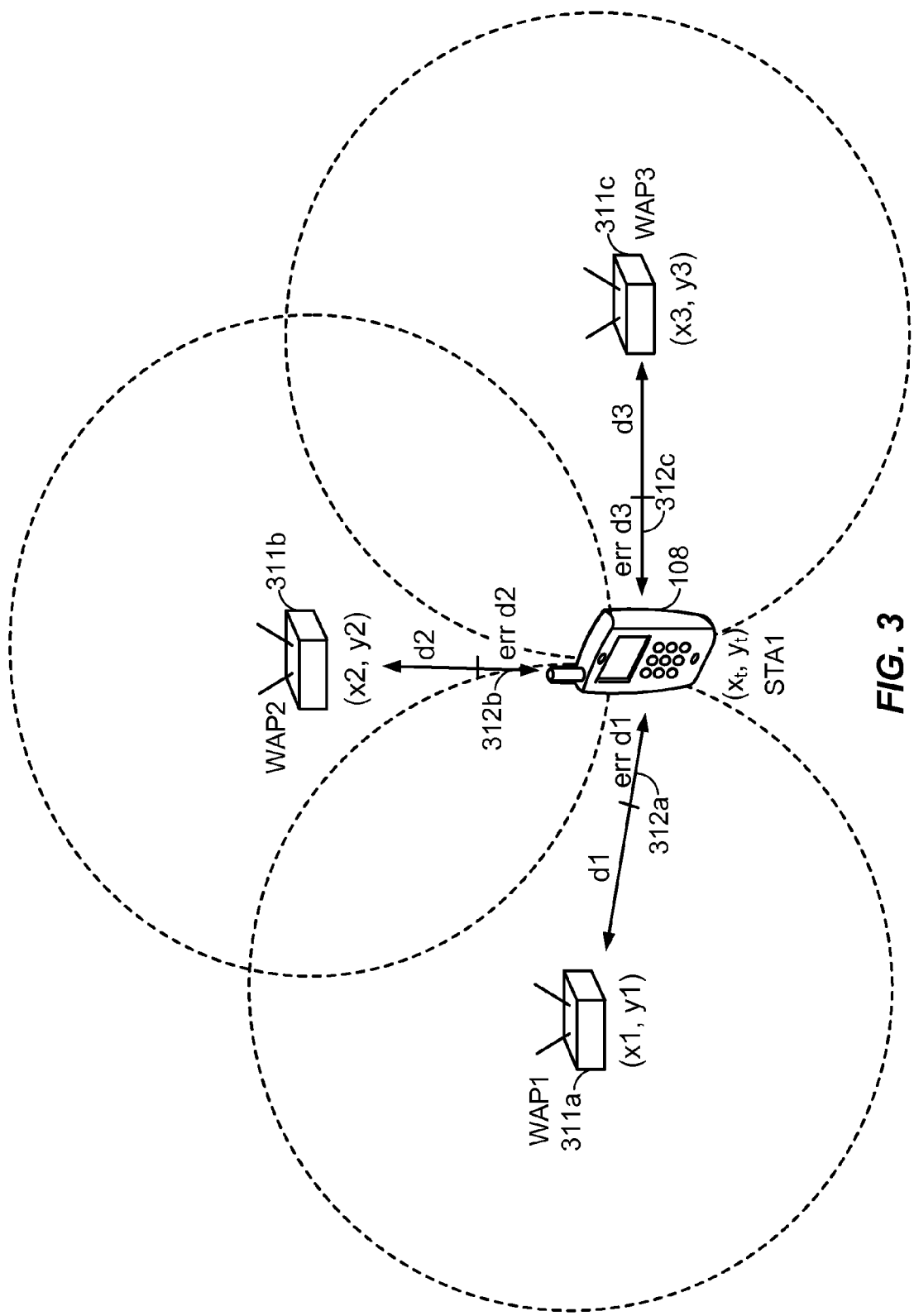
FIG. 3 is a diagram illustrating an exemplary technique for determining a position of a mobile station using wireless access points.

A simplified environment is shown in FIG. 3 for illustrating an exemplary technique for determining a position of STA1 108. The STA1 108 may communicate wirelessly with, for example, a plurality of WAPs 311 using RF signals such as 2.4 GHz signals, and standardized protocols for the modulation of the RF signals and the exchanging of information packets configured according to standards such as IEEE 802.11 and the like. By extracting different types of information from the exchanged signals, and using the layout of the network, such as the network geometry as described below, the STA1 108 may determine its position in a predefined reference coordinate system. As shown in FIG. 3, the mobile station may specify its position $(x_t, y_t)$ using a two-dimensional coordinate system; however, embodiments disclosed herein are not so limited, and may also be applicable to determining positions using, for example, a three-dimensional coordinate system, if an extra dimension is desired. Additionally, while only three WAPs, WAP1 311a, WAP2 311b, and WAP3 311c, are shown in FIG. 3, it may be desirable to use additional WAPs and solve for position using techniques applicable to over-determined systems, which can average out various errors introduced by different noise effects, and thus improve the accuracy of the determined position.

In order to determine a position $(x_t, y_t)$ for a given time t using wireless signal measurements, the mobile station STA1 108 may first need to determine the network geometry. The network geometry can include the positions of each WAP 311 in a reference coordinate system designated by coordinates $(x_k, y_k)$, where k=1, 2, 3 corresponding to locations (x1, y1) for WAP1 311a, (x2, y2) for WAP2 311b, and (x3, y3) WAP3 311c as shown in FIG. 3. The mobile station may then determine a distance $d_k$, where k=1, 2, 3, corresponding to d1 between STA 108 and WAP1 311a, d2 between STA1 108 and WAP2 311b, and d3 between STA 108 and WAP 311c. As will be described in more detail below, a number of different approaches can be used to estimate these distances ($d_k$), such as by knowledge of characteristics of the RF signals exchanged between the STA1 108 and each WAP 311. Such characteristics may include, as will be discussed below, the round trip propagation time of the signals, and the strength of the signals according to the RSSI. The distances are further subject to various errors 312a-312c, designated as $err_{dk}$, where k=1, 2, 3. Of particular interest in the present disclosure is the error attributable to processing delay of the WAPs. Eliminating significant processing delays, and in particular, variations in the processing delays among WAPs will be described in greater detail herein below.

In other embodiments, the distances ($d_k$) may in part be determined or refined using other sources of information that are not associated with the WAPs. For example, other positioning systems, such as SPS, may be used to provide a rough estimate of $d_k$. It should be noted that it is likely that SPS may have insufficient signal in the anticipated operating environments such as indoors, metropolitan area, or the like, to provide a consistently accurate estimate of $d_k$. However SPS signals may be combined with other information to assist in the position determination process. Other relative positioning devices may reside in the STA1 108 which can be used as a basis to provide rough estimates of relative position and direction.

Once each distance is determined, the mobile station can then solve for its position $(x_t, y_t)$ by using a variety of known geometric techniques, such as, for example, trilateration. From FIG. 3, it can be seen that the position of the STA1 108 ideally lies at the intersection of dotted circles surrounding each WAP. The circles can be defined by radius $d_k$ and center $(x_k, y_k)$, where k=1, 2, 3. In practice, due to noise, various systematic and random factors and other errors in the networking system, including load based processing delay in each WAP, the intersection of these circles may not lie at a single point.

To better understand the issues associated with location calculation using, for example, RTT measurement, the sections below will discuss in greater detail wireless-based position determination according to RTT measurements, including RTT measurements with uniform delay associated with an RTT_APP in accordance with various exemplary embodiments. It will be appreciated that RTT and RSSI measurements can be combined to improve the estimate of the processing time delays for each WAP 311.

Referring again to FIG. 3, determining the distance between the STA1 108 and each WAP 311 may involve using the propagation time information associated with the RF signals. In one embodiment, determining the round trip time (RTT) of signals exchanged between the STA1 108 and a WAP 311 can be performed and converted to a distance ($d_k$). RTT techniques can be used to measure the time between sending a data packet and receiving an acknowledgement. The RTT measurement methods generally use calibration to remove processing delays. However, it may be insufficient to use calibration when attempting to provide high degrees of position accuracy, particularly in applications with high demand for location precision. While in some applications and environments, the processing delays for the mobile station and the wireless access points are assumed to be the same, in reality, they are often different by varying degrees over time.

Figure 4:
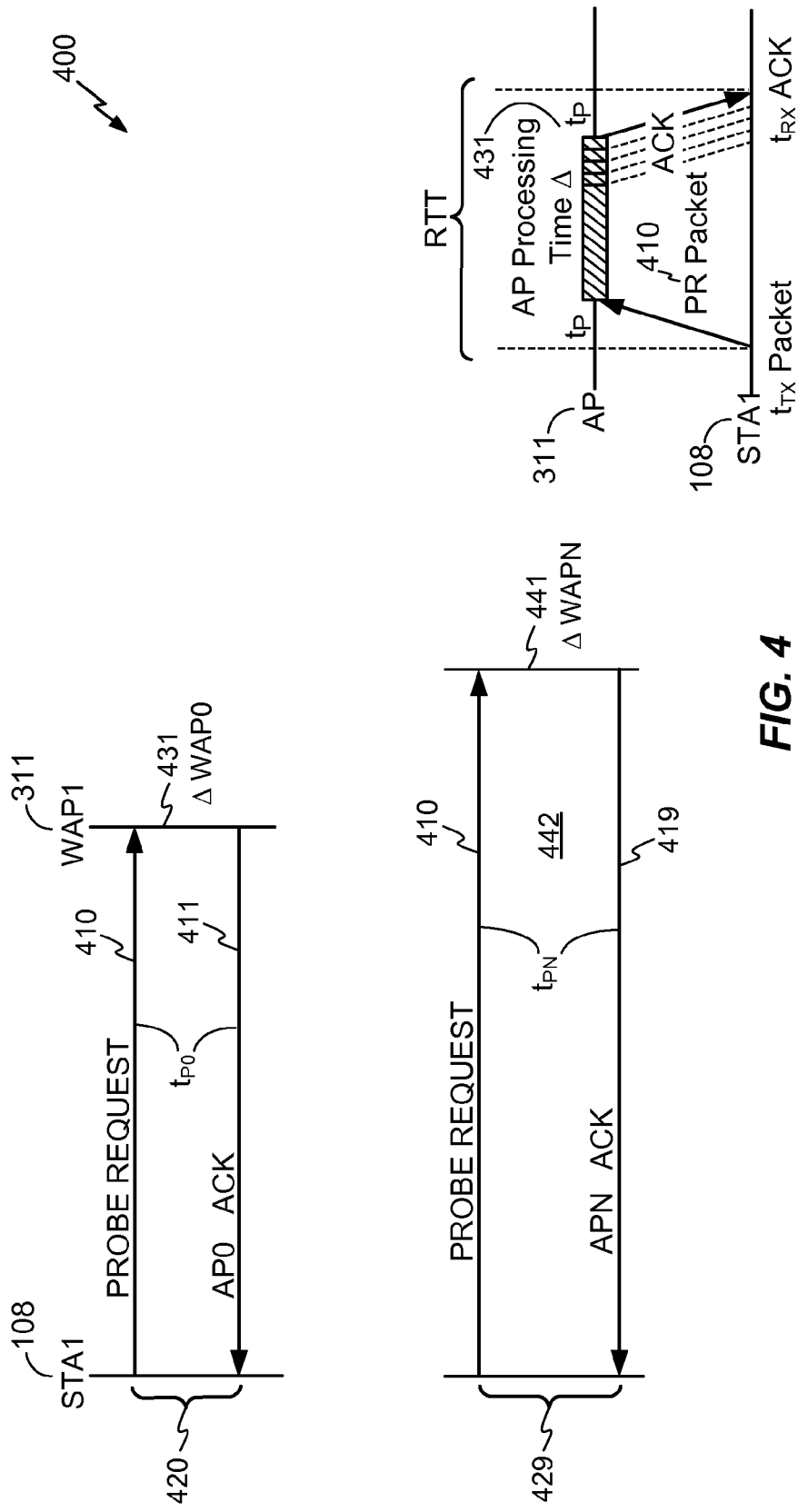
FIG. 4 is a timing diagram illustrating timing for determining a position of a mobile station using a plurality of wireless access points using round trip time (RTT).

To measure the RTT with respect to a given WAP 311, as shown in FIG. 4, the STA1 108 may send a probe request 410, such as a directed probe request, which is capable of being received by WAP 311, and possibly other WAPs that are operating and within receiving range. The time the probe request 410 was sent, such as a transmit time $t_{TX}$ for the packet can be recorded. After the corresponding propagation time $t_{P0}$ from the STA1 108 to WAP 311, which time can be generalized as $t_{PN}$ 442, the WAP will receive the packet. WAP 311 may then process the directed probe request 410 and send an ACK, such as ACK 411 back to the STA1 108 after a processing time, such as $\Delta_{WAP0}$ 431, or in the generalized case, $\Delta_{WAPN}$ 441. After a second propagation time $t_{P0}$, the STA1 108 may record the time the ACK packet was received such as a receive time $t_{RX}$ ACK. The mobile station may then determine the RTT as time 420, or in the generalized case, time 429, based on, for example, the time difference $t_{RX}$ ACK–$t_{TX}$ Packet. More simply, the RTT is equal to twice the propagation delay plus the processing delay.

By using directed probe request-based RTT ranging as described above, the STA1 108 can perform RTT measurement without directly associating with WAP 311. Since a directed access probe is considered a unicast packet, WAP 311 may typically ACK a successful decoding of an access probe packet after a prescribed period of time. By avoiding associating with WAP 311, extra overhead can be greatly reduced.

The round-trip time between the STA1 108 and WAP k may be modeled as follows in EQ. 1.

$$RTT_k = 2d_k + \Delta_k + \Delta_{STA} + n_k \quad (1)$$

where:

$d_k$ is the actual distance between the STA1 108 and $WAP_k$ 311 (ft);

$\Delta_k$ is the hardware processing time of the $WAP_k$ 311 (ns);

$\Delta_{STA}$ is the hardware processing delay at the STA1 108 (ns); and $n_k$ is the error in the RTT measurement (ns), which is the sum of the errors due to unknown WAP height, mobile station timing errors, and WAP timing errors.

It should be appreciated that because the units of distance are provided in feet, and the units of time are provided in nano-seconds, the velocity of light may be approximated as unity to simplify the model and reduce computation time by avoiding multiply operations.

It may be assumed that the STA processing delay $\Delta_{STA}$ can be calibrated out by the STA1 108, particularly for fixed processing delay. Thus $\Delta_{STA}$ can be taken as zero. If the STA1 108 knows the processing time $\Delta$ for individual $WAP_k$ 311, the propagation time to the $WAP_k$ 311 can be estimated as $(RTT_k - \Delta_k)/2$, which will correspond to the distance ($d_k$) between the STA1 108 and the $WAP_k$ 311. However, the STA1 108 typically has no knowledge of the processing time of the $WAP_k$ 311, and the STA1 108 typically must obtain an estimate of the processing time $\Delta_k$ before the distance to the $WAP_k$ 311 can be estimated. However, the WAP processing delay $\Delta_k$ can be variable from one individual WAP to another or at least may contain a variable delay component and thus may be difficult to calibrate out, particularly as non-RTT measurement related processing load increases or decreases for individual WAPs. Various exemplary embodiments of a RTT_APP as discussed and described herein are designed to alleviate the error associated with variable processing times.

In addition to estimation involving RTT, it should be noted that the distance between each WAP 311 and the STA1 108 may also be estimated, or an RTT-based estimate may be improved or confirmed using other information. In one embodiment, the additional information may include a received signal strength indication (RSSI) or measurement associated with the ACK packets received from each WAP 311.

Even though the delay in the RTT_APP may be minimal and fixed, from one RTT_APP to another, it may be necessary or desirable for a capability to estimate delays, for example, in non-RTT_APP devices, and to confirm the processing time, however negligible, for the RTT_APP. For such estimations, the RSSI approach can be used. For RSSI-based estimation, the STA1 108 may use an approximate model of distance and variance in the distance as a function of the signal strength (RSSI). The RSSI model may be used when the STA1 108 is initially trying to learn the WAP processing delays. One feature of the RTT-based positioning algorithm is that the RSSI model can be extremely simple, without the need for extensive pre-deployment fingerprinting. However, in an environment where RTT_APPs are present, RSSI estimation may be optionally eliminated to save processing resources at the STA1 108.

In an embodiment, the RSSI model may assume that the only RSSI information known to the mobile station is the approximate maximum distance $d_{max}$, in feet, as a function of RSSI in dBm. Based on initial propagation simulations for an indoor environment with WAPs having a maximum range of 225 feet, the function is provided below in EQ. 2.

$$d_{max}(RSSI) = \min\left(10^{\frac{-(RSSI+25.9)}{20.0}}, 225\right) \quad (2)$$

From the above distance bound, the STA1 108 may convert any measured RSSI to a distance estimate that may be modeled as normally distributed with the following relationships in EQ. 3 and EQ. 4:

$$d_{RSSI} = \frac{d_{max}(RSSI)}{2} \quad (3)$$

$$\sigma^2_{d_{RSSI}} = \frac{d^2_{max}(RSSI)}{16} \quad (4)$$

where the variance assumes that $4\sigma_{dRSSI} = d_{max}$.

The following description provides details for a mobile station-centric algorithm for position determination based upon from RTT and other additional measurements, which may include RSSI measurements. In an embodiment, the STA1 108 may estimate its distance to wireless access points, each having positions which are known to the STA1 108 using techniques described above. Using these distance estimates and the locations of the wireless access points 311, the STA1 108 can determine its position. It is assumed that the position of each wireless access point is known in a standard coordinate system, such as WGS-84 used in GPS.

Once the RSSI measurements are performed, a set of distances to each WAP may be determined using RSSI measurements to arrive at RSSI distances by RSSI module 220 (FIG. 2). Once the RSSI distances are determined, the distances between the mobile station and each $WAP_k$ 311 may be determined using the RTT measurements, which can be referred to as RTT distances, by RTT module 222 (FIG. 2). The RSSI distances and RTT distances may be provided to a wireless-based positioning module 216 (FIG. 2), where they can be combined using conventional trilateration techniques to determine the mobile station position. Once the STA1 108 position is determined, the processing time for each WAP 311 may be confirmed or updated based upon the determined position. Techniques for combining the RTT and RSSI measurements may be based on minimum mean square error techniques. It should be noted that in accordance with an embodiment, a given WAP can identify itself as a RTT_APP, which should alert the STA1 108 that estimation of processing delay using RSSI and the like may be unnecessary for that particular WAP. Alternatively, RTT measurements performed based on ACKs generated by an RTT_APP can be confirmed using RSSI distance estimations for accuracy confirmation or checking.

It will also be appreciated that the position estimations may further be refined, even if generated by RTT_APP-based RTT measurements, by using information obtained from, for example, the relative motion sensor 212 (FIG. 2) to refine a position of a mobile station and adjust the processing time delay for each regular (non-RTT_APP) WAP or, for confirmation, for RTT_APPs.

Figure 5:
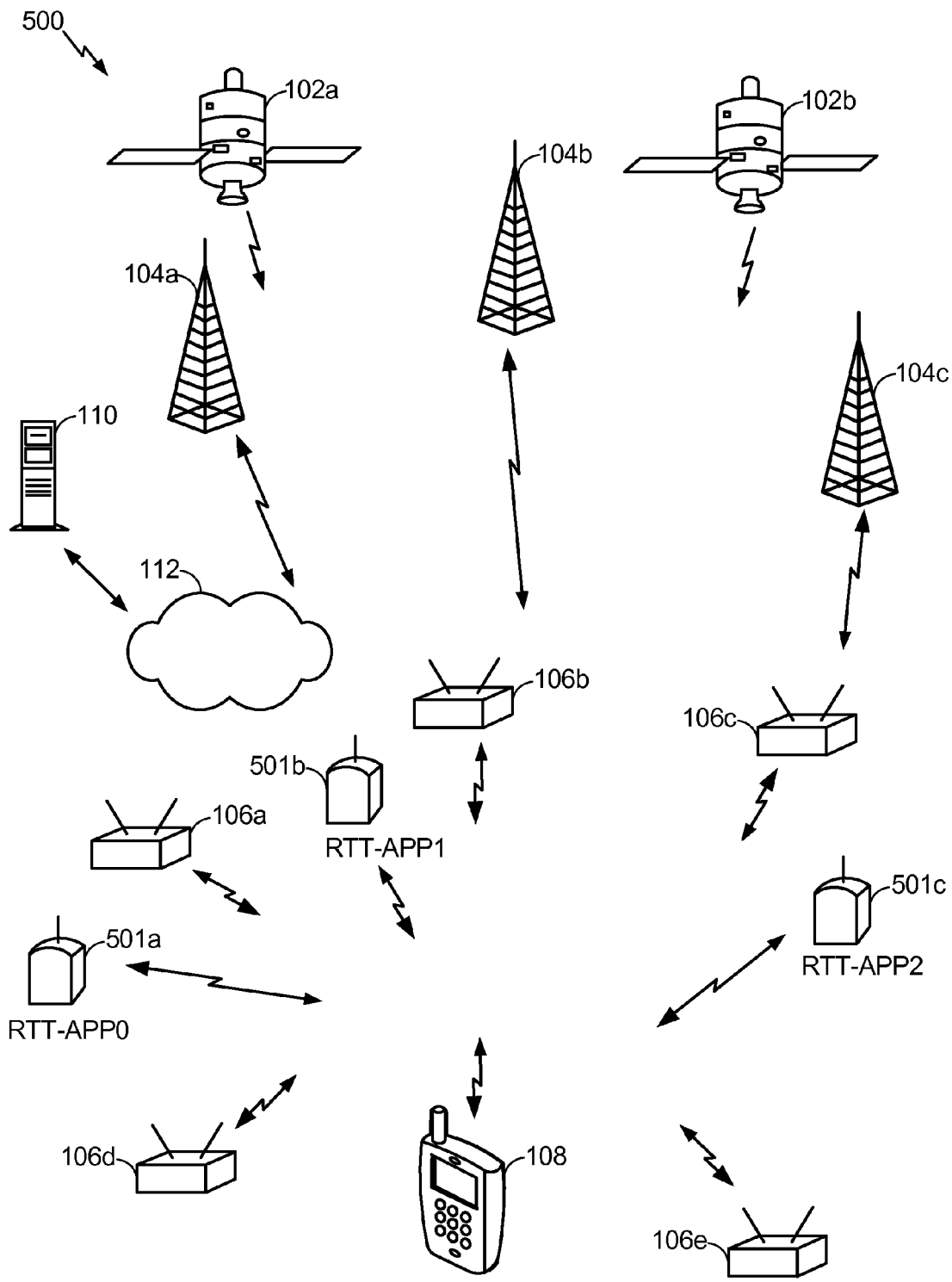
FIG. 5 is a diagram illustrating an operating environment for a mobile station using exemplary appliances.

FIG. 5 is a diagram that shows an exemplary environment 500 that includes RTT_APP0 501a-RTT_APP2 501c for providing ACKs based on, for example, a known, uniform processing delay to establish or assist in establishing an accurate estimate of the position of the STA1 108. Moreover, the embodiment illustrates that the RTT_APPs can be located in the positioning environment either alone or with other access devices such as LAN-WAPs, WAN-WAPs and satellite terminals as described in connection with FIG. 1.

Figure 6:
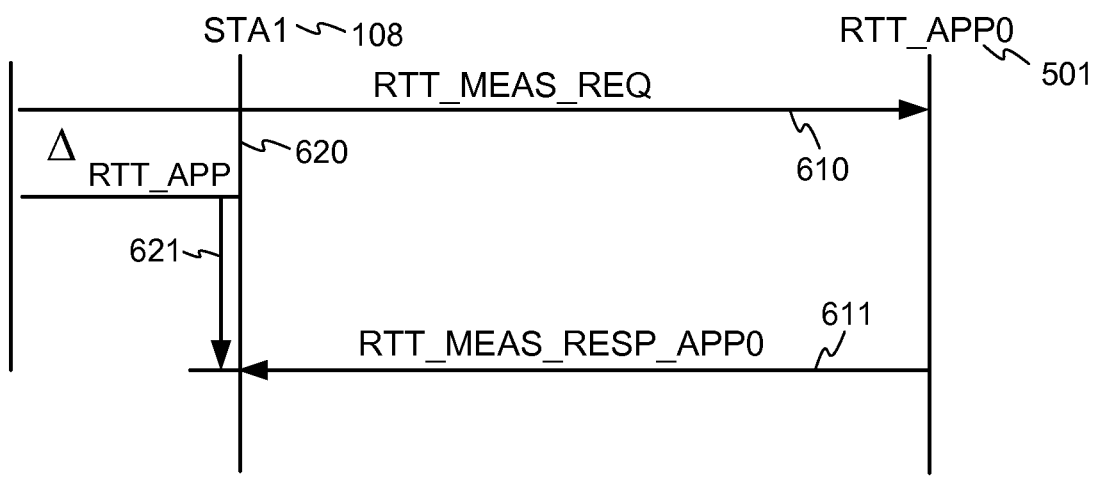
FIG. 6 is a timing diagram illustrating an exemplary timing for determining a position of a mobile station using appliances.

In an embodiment, RTT_APP 501 can provide a specialized acknowledgement, in the form of a response or acknowledgement, which is referred to in FIG. 6 as RTT_MEAS_RESP_APP0 611, in response to a directed probe request, referred to in FIG. 6 as RTT_MEAS_REQ 610. Since the processing delay for each RTT_APP is known to be negligible or uniform, the term $\Delta_k$ can be made a constant and advantageously factored out of EQ (1) above. It will be appreciated that removal of $\Delta_k$ from EQ (1) is particularly advantageous since other factors are susceptible of determination without generating estimates. For example, the processing delay $\Delta_{STA}$ of STA1 108 can be easily determined by the mobile station itself. By substituting a known value of $\Delta_{RTT\_APP}$ (processing delay for RTT_APP) for the processing delay $\Delta_k$, or by eliminating $\Delta_k$ by assuming a constant value near zero, the accuracy and the simplicity of the positioning estimates derived according to EQ (1) can be drastically increased. It will be appreciated that in an average environment, a one nano-second error in the RTT calculation can result in one-half foot of ranging error. Thus, processing delay variations of several micro-seconds could result in a large degree of error, which is unacceptable for many applications.

To better appreciate the advantages, reference is made to FIG. 6 where timing relationships are shown in a manner similar to that of FIG. 4. STA1 108 can be configured to send a probe request and/or a directed probe request, which for illustrative purposes is labeled RTT_MEAS_REQ 610. It will be appreciated that in some embodiments, the request can contain sufficient identifying characteristics that it will be recognized only by appliances, such as RTT_APPs. Alternatively, the request can be sent as a normal probe signal at which point any WAP can respond with an ACK. In such an embodiment, the appliances can either identify themselves as RTT_APPs or they can simply respond, and STAT1 108 can be configured in advance to know which of the WAPs in the environment are designated as RTT_APPs. Even in a scenario where no special identification is provided regarding the existence of RTT_APPs in the environment, the mere presence of the RTT_APP should improve the accuracy of the measurements by proving consistently accurate results meaning that STAT1 108 will be able to consistently confirm the measurement results associated with the RTT_APPs.

When the RTT_MEAS_REQ 610 is received, for example at RTT_APP0 501, an acknowledgement can be immediately generated, which for illustrative purposes is labeled as RTT_MEAS_RESP_APP0 611. It will be appreciated that the RTT_APP processing time $\Delta_{RTT\_APP}$ 620 can be assumed to be uniform among the different RTT_APPs in the environment such as RTT_APP0 501, simplifying the calculation for determining the position of STA1 108 while reducing the amount of variable error. From the time of sending the RTT_MEAS_REQ 610, the round trip time can be $\Delta_{RTT\_APP}$ 620+RTT 621 for RTT_APP0 501.

In order to provide accuracy in connection with position estimates of STA1 108 in an environment, wireless round trip measurement appliances, RTT_APPs, can be provided that will respond to probes or directed probes with an ACK signal and, in some embodiments, with additional information that could include location coordinates in (x,y) form or other form as would be understood and appreciated. The RTT_APP can be dedicated to responding only to directed requests and thus can be provisioned minimally without, for example, routing capabilities or the like that would be associated with a WAP.

Figure 7:
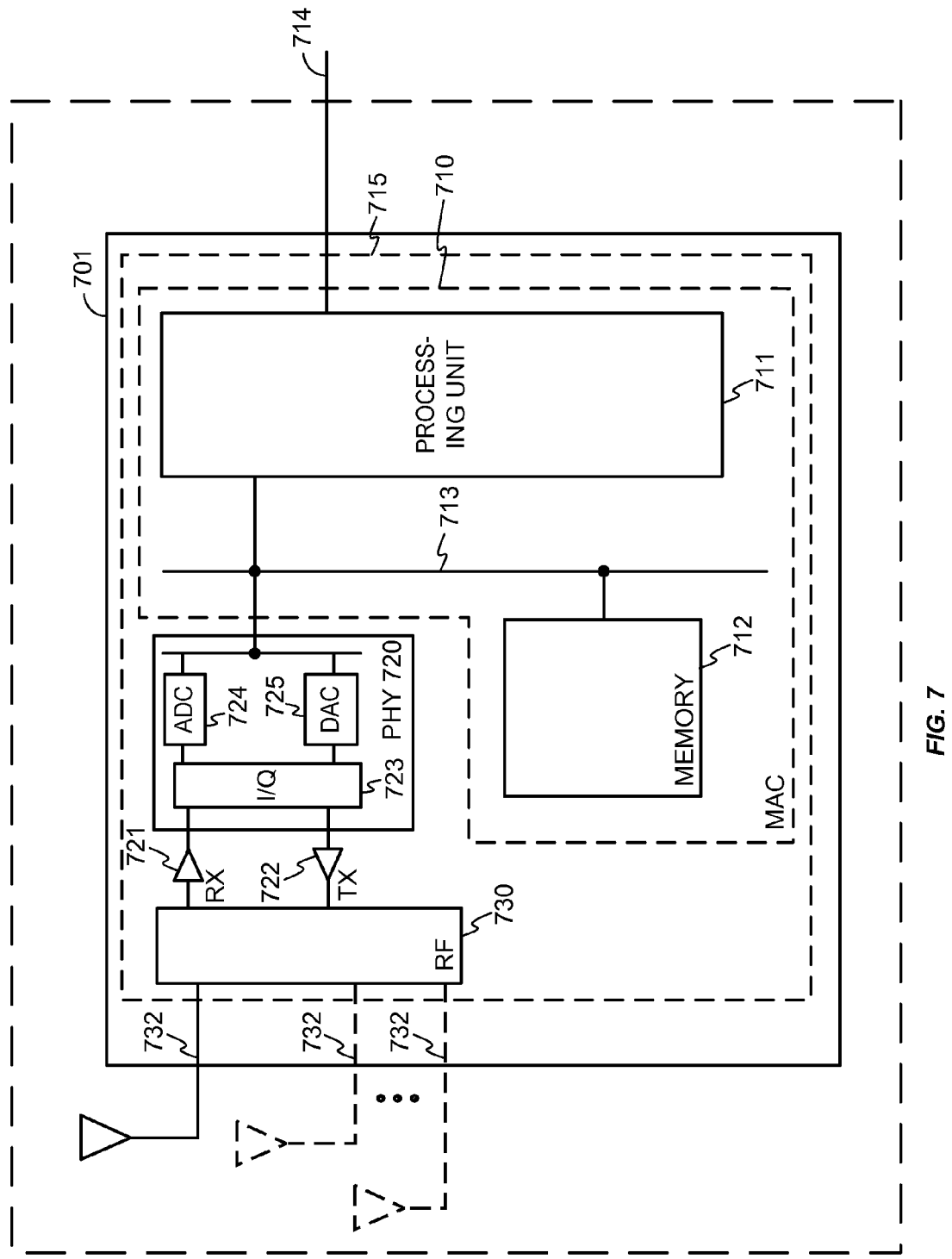
FIG. 7 is a block diagram illustrating various components of an exemplary appliance.

An exemplary structure for an RTT_APP is illustrated in FIG. 7. A RTT_APP unit 701, which can be a dedicated appliance for acknowledging directed probes or requests such as RTT_MEAS_REQ 610 or the like, can be provided with basic components such as a media access control (MAC) block 710, a physical layer (PHY) block 720, and a radio frequency (RF) block 730. It will be appreciated that while the blocks are shown as separate, some or all of the MAC block 710, PHY block 720 and RF block 730 can be integrated together in the same module, unit, cell or the like, such as module 715. In particular, it will be appreciated that the PHY block 720 can incorporate the RF block 730, and in some cases the MAC block 710. In other embodiments, parts of the blocks may overlap, as will be understood. While it is appreciated that the distribution of the functionality can be flexible, MAC block 710 should be hardware based and as simple as possible since the primary task of MAC block 710 is to respond to the RTT probe request. If beaconing is supported, the MAC block 710 should also perform functions such as carrier sense and medium access in accordance with 802.11 standards, but such standards support can be provided in a significantly simplified manner compared to a full featured access point which would need to support several features related to security, turbo modes, packet aggregation and the like. If beaconing is supported, the automatic response may include a beacon frame, and the MAC block 710 may implement one of a carrier sense mechanism and a back-off mechanism using the beacon frame. While a description of the components of various blocks is provided in accordance with the illustrative embodiment, the arrangement may be different depending on the implementation details of a particular configuration, whether there is structural or functional overlap between the blocks, or the like.

The MAC block 710 can be provided with a processing unit 711, which can be a general purpose or special purposes processor provided performance parameters are met. It will be appreciated that in the case of a software implementation, the various detailed algorithms and procedures as described herein will be transformative to allow any processing unit to specifically implement embodiments of the invention. Alternatively, the processing unit can be specially adapted to carry out operation in accordance with embodiments based on application specific or custom design. The processing unit 711 can be accompanied by a memory 712, which can be an on-board or external memory meaning that memory 712 can be integrated within the same circuit as processing unit 711 or can be an external component or cell, or a combination of both. The components can be coupled by a bus connector 713, which can be a serial or parallel bus or connector or some other configuration as will be appreciated.

PHY block 720 can be configured to receive and transmit, for example, signals from and to the radio environment at an in-phase and quadrature (I/Q) block 723 which passes inbound analog signals from the radio environment (e.g., a transmission band frequency) to an analog to digital converter (ADC) 724 and passes outbound digital signals (e.g., a digital baseband frequency) to a digital to analog converter DAC 725. The processing unit 711 can also be coupled to external devices or systems through a connector 714. The MAC block 710 can be coupled to the PHY block 720 through the bus 713, or through similar means, or, may be integrated with the PHY block 720 subject to signal constraints such as data rate or the like. It will be appreciated that in some embodiments, the PHY block 720 and MAC block 710 may be integrated, or in embodiments where the MAC block 710 is implemented in hardware, the MAC functionality may be hardware oriented, that is, there is no need to fully decode the probe request packets. Instead, probe requests such as RTT_MEAS_REQ 610, can be recognized at a hardware layer and responded to immediately, referred to as a hardware MAC layer, in a manner that reduces processing delays to a negligible amount. It is also possible that an acknowledgement can be generated before receipt of the full request is processed as long as enough of the request is processed to identify it as such. Such an approach reduces processing delay to almost zero.

It will be appreciated that signals may travel to and from the RTT_APP unit 701 in the air interface, and may be sent to and received from the air interface using RF block 730, which can include one or, in accordance with, for example, antenna diversity arrangements, and the like, more antenna 732. The RF block can perform down conversion of the transport frequency signal to an intermediate frequency (IF) signal (not shown), where it can be passed to PHY 720 through an amplifier 721. Generated IF signals can be passed from the PHY block 720 to an amplifier 722 to be passed to the RF block 730 and, if necessary, up-converted for transmission. In some embodiments, direct conversion may be used, wherein no intermediate frequency conversion of received RF signals, or signals to be transmitted over the RF block 730, is required and signals are converted directly from transport frequency (e.g., a transmission band frequency, such as an 802.11 transmission band) into digital vectors and processed directly. It will be appreciated that to the extent that the RF frequency or transport frequency signals can be recognized through either direct conversion or an RF MAC functionality, involving recognition of the signals without conversion, baseband down-conversion and transport band up conversion can be avoided, acknowledgements can be generated more quickly leading to better performance for RTT_APP unit 701 and, thus, greater positional accuracy for location estimates for STA1 108.

Figure 8:
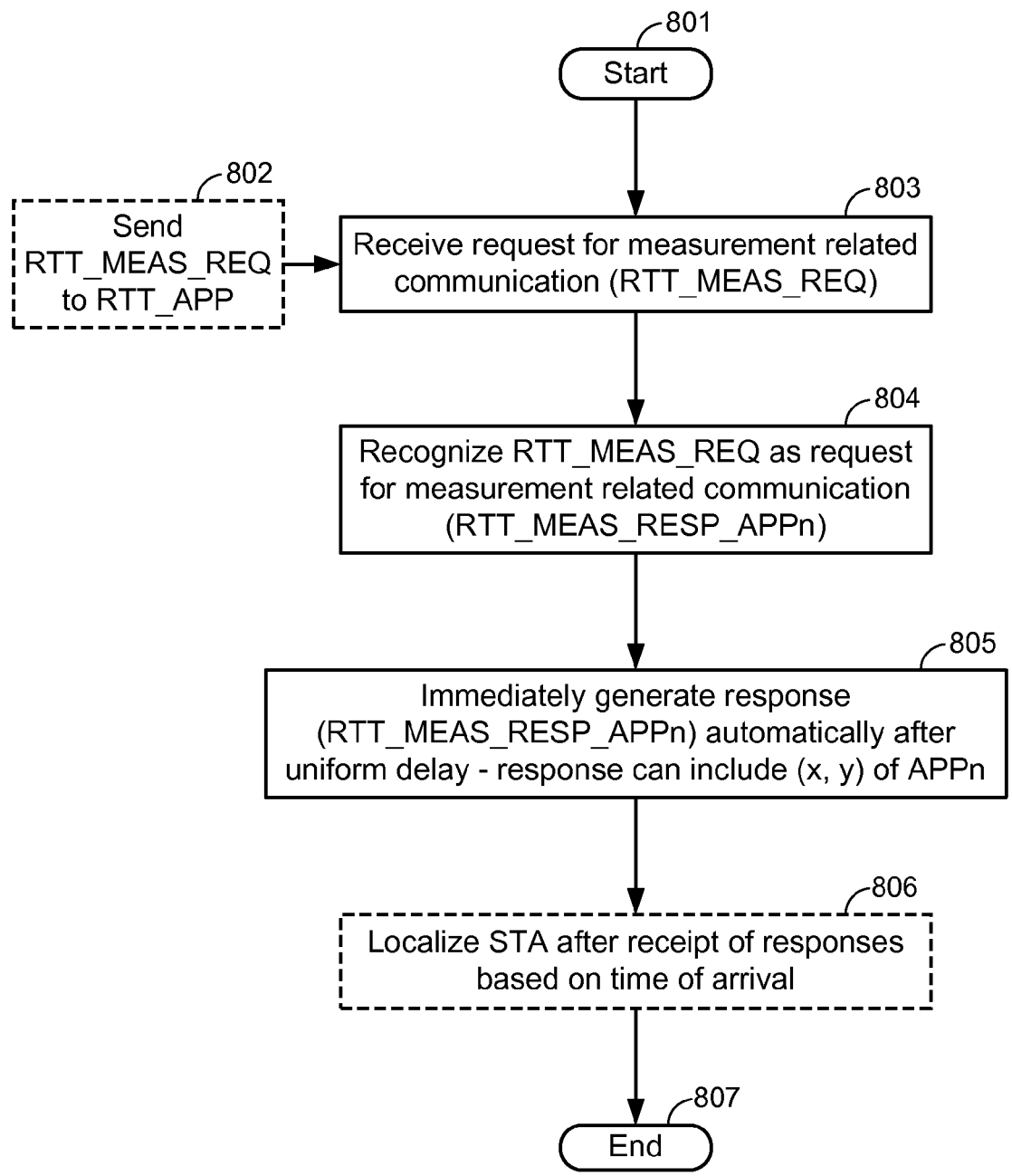
FIG. 8 is a flow chart illustrating an exemplary method for facilitating localization using an appliance.

It will be appreciated that in accordance with embodiments, localization of, for example, a mobile unit such as STA1 108 described herein, can be facilitated through the use of responses generated by dedicated appliances to requests for measurement related communication such as location measurement related communication. In an exemplary method, selected components of which are illustrated in FIG. 8, after start at 801, dedicated requests can be optionally sent at 802 that identify a request as an RTT_MEAS_REQ(APPn), which can be a request type that indicates a specific request for a measurement related communication, such as an RTT_MEAS_RESP_APPn from a compliant RTT_APPn ((APPn) can be an identifier associated with the appliance RTT_APPn). It should be noted that, while the above example includes reference to a directed request to an RTT_APPn, the request can be sent as a unicast, multicast or broadcast communication or combination thereof to one appliance, if known, or to many appliances. Alternatively, the request can be sent as a normal probe request in a unicast, multicast or broadcast fashion, in which case all access points within range, including RTT_APPs and non-RTT_APPs alike will respond. The request can be received at 803, such as at an RTT_APP or at any access point within range of the sender of the request. If appropriate, the receiver can recognize or otherwise identify the request at 804 as a RTT_MEAS_REQ (APPn), for example, based on a request type of the request and/or an identifier associated with the appliance.

A response, such as RTT_MEAS_RESP_APPn, can be immediately generated at 805 after uniform processing delay $\Delta_{RTT\_APP}$. It should be noted that the processing period is referred to herein as a delay even in a scenario where the actual delay in generating the response is very small. Once the request has been fully received, for calculation purposes there will be some non-zero time amount, however negligible, that represents systematic processing of the response while the receipt of the request is being conducted. The amount however will be uniform or can be configured to be uniform therefore for calculation purposes can be factored out as described herein above. In generating the response, it will also be noted that a position of the RTT_APPn using, for example, (x, y) coordinates can be included in the response to aid in localization. In an embodiment, the MAC address of the RTT_APP can be looked up in a database to get the (x,y) coordinates of the RTT_APP. Alternatively, a list of RTT_APPs in a locale can be provided to a mobile station when it enters the locale. When a sufficient number of responses have been received by the requesting station or, in the case where position estimates have already been established, an additional single response has been received, localization can be conducted at 806. Alternatively, refinement of a previous localization procedure or position estimate can be conducted using one or more responses. While the exemplary method is indicated as being completed at 807, it will be appreciated that the process can be continued indefinitely, for example, as the mobile station is in motion, or the like.

Those of skill in the art will appreciate that in accordance with embodiments described in the present disclosure, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and algorithms described in connection with the embodiments disclosed herein may be embodied directly in hardware, in a software module executed by a processing unit, or in a combination of the two. A software module may reside in RAM memory, flash memory, ROM memory, EPROM memory, EEPROM memory, registers, a hard disk, a removable disk, a CD, a DVD, or any other form of storage medium known in the art. An exemplary storage medium is coupled to the processing unit such that the processing unit can read information from, and write information to, the storage medium. In the alternative, the storage medium may be integral to the processing unit.

Accordingly, an embodiment of the invention can include a computer-readable medium embodying a method for adjusting wireless-based positions using relative motion sensors. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and actions of the claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A mobile station, comprising:
   a transceiver; and
   a processing unit configured to:
      determine a first round-trip time (RTT) for a first measurement related communication between the transceiver and a first network device, wherein the first RTT comprises a uniform delay of time applied during the first measurement related communication by the first network device;
      determine a second RTT for a second measurement related communication between the transceiver and a second network device, wherein the second RTT comprises the uniform delay of time applied during the second measurement related communication by the second network device; and
      determine, at least in part, a position of the mobile station with regard to at least the first and second network devices based, at least in part, on the first RTT and the second RTT.

2. The mobile device of claim 1, wherein the processing unit is configured to determine, at least in part, the position of the mobile station with regard to at least the first and second network devices based, at least in part, on the first RTT and the second RTT, by:
   initiating transmission, via the transceiver, of the first RTT and the second RTT to another device; and
   in response, receiving from the another device, via the transceiver, the position of the mobile device.

3. The mobile device of claim 1, wherein the processing unit is further configured to:
   determine a received signal strength measurement for at least one signal received via the transceiver from at least transmitting device; and
   determine, at least in part, the position of the mobile station further based, at least in part, on the received signal strength.

4. The mobile station of claim 1, wherein at least one of the first network device or the second network device is part of a short-range wireless network.

5. The mobile station of claim 1, wherein the transceiver supports an 802.11 transmission band.

6. An apparatus for use in a mobile station, the apparatus comprising:
   means for determining a first round-trip time (RTT) for a first measurement related communication between the transceiver and a first network device, wherein the first RTT comprises a uniform delay of time applied during the first measurement related communication by the first network device;
   means for determining a second RTT for a second measurement related communication between the transceiver and a second network device, wherein the second RTT comprises the uniform delay of time applied during the second measurement related communication by the second network device; and
   means for determining, at least in part, a position of the mobile station with regard to at least the first and second network devices based, at least in part, on the first RTT and the second RTT.

7. The apparatus of claim 6, wherein the means for determining, at least in part, the position of the mobile station further comprise:
   means for sending the first RTT and the second RTT to another device; and
   means for receiving, in response from the another device, the position of the mobile device.

8. The apparatus of claim 6, and further comprising:
   means for determining a received signal strength measurement for at least one signal received via the transceiver from at least transmitting device; and
   means for determining, at least in part, the position of the mobile station further based, at least in part, on the received signal strength.

9. The apparatus of claim 6, wherein at least one of the first network device or the second network device is part of a short-range wireless network.

10. A method for use in a mobile station, the method comprising, at the mobile station:
    determining a first round-trip time (RTT) for a first measurement related communication between the transceiver and a first network device, wherein the first RTT comprises a uniform delay of time applied during the first measurement related communication by the first network device;
    determining a second RTT for a second measurement related communication between the transceiver and a second network device, wherein the second RTT comprises the uniform delay of time applied during the second measurement related communication by the second network device; and determining, at least in part, a position of the mobile station with regard to at least the first and second network devices based, at least in part, on the first RTT and the second RTT.

11. The method of claim 10, and further comprising, at the mobile station:
sending the first RTT and the second RTT to another device; and
receiving, in response from the another device, the position of the mobile device.

12. The method of claim 10, and further comprising, at the mobile station:
determining a received signal strength measurement for at least one signal received via the transceiver from at least transmitting device; and
determining, at least in part, the position of the mobile station further based, at least in part, on the received signal strength.

13. The method of claim 10, wherein at least one of the first network device or the second network device is part of a short-range wireless network.

14. A non-transitional computer-readable medium having instructions stored therein that are executable by a processing unit of a mobile station to:
determine a first round-trip time (RTT) for a first measurement related communication between the transceiver and a first network device, wherein the first RTT comprises a uniform delay of time applied during the first measurement related communication by the first network device;
determine a second RTT for a second measurement related communication between the transceiver and a second network device, wherein the second RTT comprises the uniform delay of time applied during the second measurement related communication by the second network device; and
determine, at least in part, a position of the mobile station with regard to at least the first and second network devices based, at least in part, on the first RTT and the second RTT.

15. The non-transitional computer-readable medium of claim 14, wherein the instructions are further executable by the processing unit of the mobile station to:
send the first RTT and the second RTT to another device; and
receive, in response from the another device, the position of the mobile device.

16. The non-transitional computer-readable medium of claim 14, wherein the instructions are further executable by the processing unit of the mobile station to:
determine a received signal strength measurement for at least one signal received via the transceiver from at least transmitting device; and
determine, at least in part, the position of the mobile station further based, at least in part, on the received signal strength.

17. The non-transitional computer-readable medium of claim 14, wherein at least one of the first network device or the second network device is part of a short-range wireless network.

\* \* \* \* \*